United States Patent Office 3,067,233
Patented Dec. 4, 1962

3,067,233
TRIALKOXYMETHYLENEPHOSPHORANES AND
THEIR PREPARATION
William J. Middleton, Clayment, Del., assignor to E. I.
du Pont de Nemours and Company, Wilmington, Del.,
a corporation of Delaware
No Drawing. Filed Aug. 4, 1960, Ser. No. 47,349
15 Claims. (Cl. 260—461)

This invention relates to organic phosphorus compounds and has as its principal objects provision of novel trialkoxymethylenephosphoranes and of a method for the preparation of the same.

Many organic phosphorus compounds are known and these possess a number of properties that make them of particular interest in various applications, e.g., as additives for lubricating oils, as solvents or plasticizers for synthetic polymers, and as chemical intermediates in the preparation of other useful compounds.

A new class of organic phosphorus compounds is provided by this invention. These novel compounds are trialkoxymethylenephosphoranes of the formula

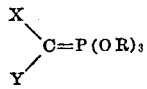

wherein R is an alkyl radical and X and Y individually are monovalent organic radicals or taken together are divalent organic radicals in which X and Y radicals the carbons joined to the carbon of the C=P(OR)₃ moiety are free of hydrogen. A preferred group of the trialkoxymethylenephosphoranes of this invention are those of the above formula wherein X and Y individually are monovalent aromatic hydrocarbon radicals of up to 12 carbons, or radicals of the formula R'CF₂ and R"CF₂, respectively, wherein R' and R" are halogen, hydrocarbon radicals of up to 11 carbons, or halogenated hydrocarbon radicals of up to 11 carbons, and X and Y taken together form a divalent aromatic hydrocarbon radical of up to 12 carbons.

An especially preferred group of the products of this invention are those of the above formula in which the R groups are radicals of up to 15 carbon atoms and X and Y are R'CF₂ and R"CF₂, respectively wherein R' and R" are halogens, alkyl radicals of up to 6 carbon atoms or haloalkyl radicals of up to 6 carbon atoms.

The process of this invention comprises the reaction of a trialkyl phosphite, (RO)₃P, wherein R is an alkyl radical, preferably of up to 15 carbon atoms, with a thioketone in which each of the carbon atoms adjacent to the thiocarbonyl carbon are free of hydrogen, e.g., in which these α-carbons are joined to at least two fluorine atoms and to a halogen, a hydrocarbyl or a halohydrocarbyl radical, or in which the said α-carbons are members of an aromatic hydrocarbon ring; or with a dimer of such a thioketone. The thioketone reactants used in the process of this invention have a general formula

and their dimers have the formula

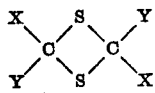

wherein X and Y have the meanings defined hereinbefore.

The process of this invention is conveniently carried out by simply mixing two moles of the trialkyl phosphite with one mole of the thioketone (or four moles of the trialkyl phosphite with one mole of the dimer of the thioketone). The reaction proceeds exothermically at temperatures below 0° C. Reaction temperatures ranging from about −80° C. up to about 100° C. are operable. However, it is preferred to maintain the reaction mixture at a temperature between −80° C. and 30° C. since at temperatures above 30° C. the products tend to rearrange. The two reactants can be mixed together in either order. However, it is generally preferred to use an excess, e.g., a 10% excess, of the trialkyl phosphite and to add the reactants at such a rate that the reaction temperature can be maintained at the desired value. The reaction pressure is not critical. Atmospheric pressure is convenient but subatmospheric or superatmospheric pressures can be used if desired. The reaction takes place almost instantaneously. However, it is generally preferred to maintain the reactants at the reaction temperature for a few minutes, e.g., 15 minutes or more, after all the reactants are mixed together. The end of the reaction is also indicated by a cessation of the heat of reaction after all the reactants have been added. The reaction mixture can be held at reaction temperature for several hours longer if desired.

The trialkoxymethylenephosphorane product can be isolated from the reaction mixture by conventional methods. For example, when the product is a liquid, it can be isolated by fractional distillation and the product is a solid, it can be isolated by fractional crystallization. High boiling products can also be isolated by distillation in a molecular still.

The trialkyl phosphite reactants used in the process of this invention can be made by known methods. The thioketone reactants having aromatic hydrocarbon substituents can also be made by known methods. The thioketones of the type

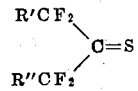

wherein R' and R" are halogen, hydrocarbon, or halogenated hydrocarbon radicals can be prepared by methods such as the following: In one method, a secondary polyfluoroalkyl iodide (i.e., of at least three carbon atoms) is reacted with hot liquid or vapor of a phosphorus polysulfide, e.g. P₂S₅ or P₄S₃, as illustrated the equation:

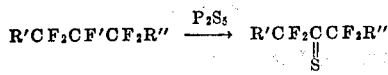

wherein R' and R" have the meanings defined previously. Preferably, the polyfluoroalkyl halide is introduced in vapor form into the refluxing phosphorus polysulfide, e.g., at 525° C. when P₂S₅ is being used and at 413° C. when P₄S₃ is being used, and the volatile polyfluorothioketone which is formed is collected in a receiver cooled below the boiling point of the polyfluorothioketone. Another method that can be used to prepare the fluorothioketone reactants consists in heating a polyfluoroketone with phosphorus pentasulfide for several hours at elevated temperatures, e.g., 200–300° C., under autogenous pressure. This reaction is illustrated by the equation:

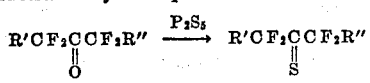

wherein R' and R" have the meanings defined above. The polyfluoroketones used as starting materials in this method can be prepared by known methods, e.g., as described on p. 183 of "Aliphatic Fluorine Compounds," Lovelace, Rausch and Postelnek, Reinhold Publishing Corp., New York, 1958.

The monomeric fluorothioketones prepared as described above dimerize on standing at temperatures above about −80° C. The dimers, as well as the monomers, are useful as reactants in the process of this invention. The processes of preparing the monomers and dimers described above are disclosed in U.S. Patent 2,970,173, issued January 31, 1961, to E. G. Howard and W. J. Middleton.

The products and processes of this invention are illustrated in further detail by the following examples in which the proportions of ingredients are expressed in parts by weight unless otherwise specified.

EXAMPLE I

*Preparation of Trimethoxybis(Trifluoromethyl)Methylenephosphorane From Tetrakistrifluoromethyl-1,3-Dithietane*

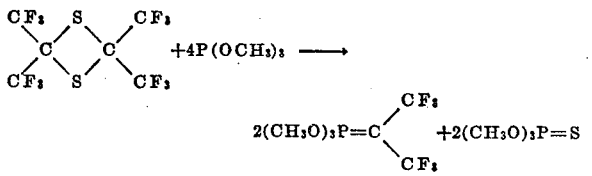

Trimethyl phosphite, 24.8 parts (0.2 mole), contained in a glass reaction vessel is cooled in an ice bath and 12.1 parts (0.033 mole) of tetrakis(trifluoromethyl)-1,3-dithietane (hexafluorothioacetone dimer, which can be prepared by allowing monomeric hexafluorothioacetone to warm from a temperature of about $-80°$ to room temperature over a period of about 16 hours) is added dropwise with stirring at such a rate that the temperature does not rise above $30°$ C. Less than 0.5 hour is required for the complete addition of the dithietane. The reaction mixture is then distilled and there is obtained 7.1 parts of trimethyl thiophosphate, B.P. $31-32°$ C./0.35 mm., and $n_D^{26}=1.4503$, 14.4 parts of trimethoxybis(trifluoromethyl)methylenephosphorane as colorless oil, B.P. $61-62°$ C./0.35 mm., $n_D^{26}=1.3660$. The nuclear magnetic resonance fluorine spectrum of the phosphorane contains one resonance line split to a doublet. This is consistent for the structure shown above.

*Analysis.*—Calc'd for $C_3H_9O_3PS$: C, 21.3%; H, 5.8%; P, 19.9%; S, 20.4%. Found: C, 21.39%; H, 6.4%; P, 20.58%; S, 19.71%.

Calc'd for $C_6H_9F_6O_3P$: C, 26.28%; H, 3.31%; P, 11.30%; F, 41.59%. Found: C, 26.46%; H, 3.73%; P, 11.79%; F, 41.77%.

EXAMPLE II

*Preparation of Trimethoxybis(Trifluoromethyl)Methylenephosphorane From Hexafluorothioacetone*

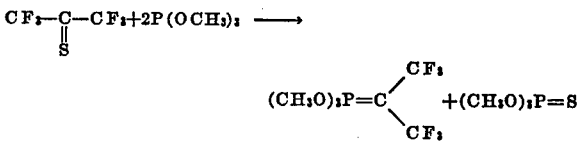

Trimethyl phosphite, 15 parts (0.12 mole), is added dropwise to 9.9 parts (0.06 mole) of hexafluorothioacetone (which can be prepared by introducing vapor of 2-iodoperfluoropropane into a reaction vessel containing refluxing phosphorus pentasulfide and cooling to about $-80°$ C. the hexafluorothioacetone that is formed) contained in a glass reaction vessel cooled by a mixture of solid carbon dioxide and acetone (about $-80°$ C.). The blue color fades after the addition of one drop of the phosphite. When about one-half of the phosphite is added, the reaction mixture is warmed to $0°$ C. and the addition is then continued. After all the phosphite is added, the reaction mixture is distilled under reduced pressure. There is obtained 6.2 parts of trimethyl thiophosphate and 13.2 parts of trimethoxybis(trifluoromethyl)methylenephosphorane.

EXAMPLE III

*Preparation of Triethoxybis(Trifluoromethyl)Methylenephosphorane*

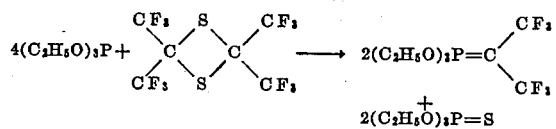

Triethyl phosphite, 33.2 parts (0.2 mole), is added dropwise over a period of 15 minutes to 18.2 parts (0.05 mole) of hexafluorothioacetone dimer (tetrakistrifluoromethyl-1,3-dithietane) in a reaction vessel cooled in an ice bath. At the end of this period, the reaction mixture is distilled under reduced pressure. There is obtained 10.1 parts of triethoxybis(trifluoromethyl)methylenephosphorane as a colorless liquid, B.P. $74-75°$ C./0.25 mm., $n_D^{26}=1.3793$.

*Analysis.*—Calc'd for $C_9H_{15}F_6O_3P$: C, 34.18%; H, 4.78%; F, 36.05%; P, 9.80%. Found: C, 34.32%; H, 5.16%; F, 35.75%; P, 9.94%.

EXAMPLE IV

*Preparation of Triisopropoxybis(Trifluoromethyl)Methylenephosphorane*

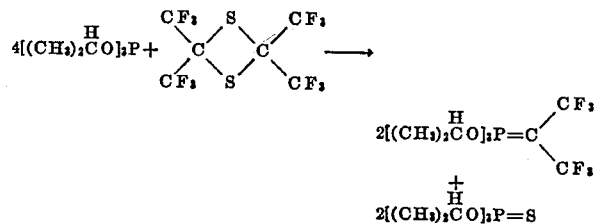

Triisopropyl phosphite, 41.6 parts (0.2 mole), is added dropwise over a period of 15 minutes to 18.2 parts (0.05 mole) of stirred hexafluorothioacetone dimer in a reaction vessel cooled in an ice bath. The reaction mixture is then distilled under reduced pressure. There is obtained 10.1 parts of triisopropoxybis(trifluoromethyl)-methylenephosphorane as a colorless liquid, B.P. $75-76°$ C./0.5 mm., $n_D^{25}=1.3878$.

*Analysis.*—Calc'd for $C_{12}H_{21}F_6O_3P$: C, 40.23%; H, 5.92%; F, 31.82%; P, 8.66%. Found: C, 40.55%; H, 5.92%; F, 31.46%; P, 8.82%

EXAMPLE V

*Preparation of Tris(Dodecyloxy)Bis(Trifluoromethyl)-Methylenephosphorane*

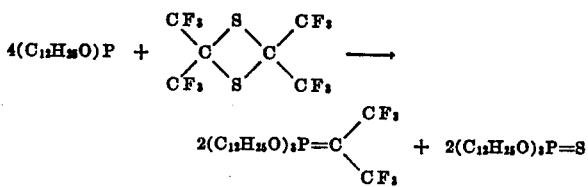

A mixture of 94 parts (0.16 mole) of trisdodecyl phosphite and 14.6 parts (0.04 mole) of hexafluorothioacetone dimer is stirred together at room temperature until the two-phase mixture becomes homogeneous, about 0.5 hour being required. The nuclear magnetic resonance fluorine spectrum obtained on this mixture indicates a clean reaction with only one resonance line split to a doublet. This indicates that tris(dodecyloxy)bis(trifluoromethyl)methylenephosphorane is present. The product decomposes when distillation is attempted.

EXAMPLE VI

*Preparation of Trimethoxyfluorenylidenephosphorane*

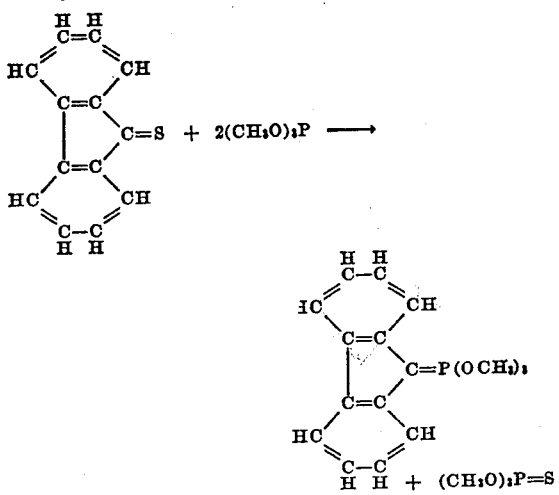

A mixture of 6.3 parts (0.032 mole) of thiofluorenone [which can be prepared by the method described by Campaigne and Reid in the J. Am. Chem. Soc., 68, 769 (1946)] and 63 parts of pentane are stirred at room temperature under an atmosphere of nitrogen and 8.0 parts (0.064 mole) of trimethyl phosphite is added dropwise over a period of 10 minutes. The green color of the thiofluorenone fades and a yellow solid is formed. This solid is collected on a filter under nitrogen and is washed with pentane. There is obtained 7.3 parts of trimethoxyfluorenylidenephosphorane as a yellow powder, M.P. 105–107° C. A portion of this solid is recrystallized from a mixture of benzene and hexane and then from hexane to give white needles; M.P. 108° C.

*Analysis.*—Calc'd for $C_{16}H_{17}O_3P$: C, 66.66%; H, 5.95%; P, 10.75%. Found: C, 66.55%; H, 5.92%; P, 10.90%.

The examples have illustrated the products and process of this invention by reference to the preparation of certain trialkoxymethylenephosphoranes. However, the process of this invention is applicable to any trialkyl phosphite and any thioketone or thioketone dimer having the structure defined hereinbefore. Thus, following the procedures described in the examples, the trialkyl phosphites listed in the first column of the following Table I react with the specific thioketone, or thioketone dimer, listed in the second column of the table to give the trialkoxymethylenephosphorane listed in the third column.

The trialkoxymethylenephosphoranes of this invention are useful in a wide variety of applications. They are particularly useful as chemical intermediates. Their chemical reactivity is shown by the following examples:

EXAMPLE A

*Thermal Rearrangement*

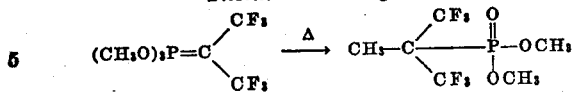

Twenty parts of trimethoxybis(trifluoromethyl)methylenephosphorane is heated under reflux for 1 hour. An exothermic reaction takes place when the reaction mixture reaches a temperature of about 180° C. (approximately 10 minutes after refluxing starts) and the reaction vessel is cooled to prevent flooding the condenser. At the end of one hour reaction time, the mixture is distilled at reduced pressure. There is obtained 17 parts of dimethyl 1,1-bis(trifluoromethyl)ethylphosphonate as a colorless oil with a minty odor, B.P. 40–41° C./0.8 mm., $n_D^{27}=1.3596$. The nuclear magnetic resonance and infrared absorption spectra are consistent with the structure of this product indicated above.

*Analysis.*—Calc'd for $C_6H_9F_6O_3P$: C, 26.28%; H, 3.31%; F, 41.59%; P, 11.03%. Found: C, 26.45%; H, 3.47%; F, 41.61%; P, 11.60%.

EXAMPLE B

*Hydrolysis*

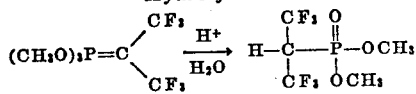

Thirty parts of concentrated hydrochloric acid is added dropwise to 22 parts (0.08 mole) of trimethoxybis(trifluoromethyl)methylenephosphorane. A vigorous evolution of gas occurs during addition of the acid. The reaction mixture is then mixed with 50 parts of water and the lower organic layer is separated and washed again with 50 parts of water. The washed product is dried over silica gel and is then distilled. There is obtained 10.9 parts of dimethyl bis(trifluoromethyl)-methylenephosphonate as a colorless oil, B.P. 44° C./0.4 mm. The nuclear magnetic resonance and infrared absorption spectra are consistent with the structure of this compound indicated above.

*Analysis.*—Calc'd for $C_5H_7F_6O_3P$: C, 23.05%; H, 2.69%; F, 43.83%; P, 11.91%. Found: C, 24.11%; H, 2.97%; F, 42.52%; P, 11.87%.

EXAMPLE C

*Bromination*

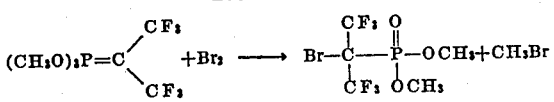

A solution of 13.7 parts (0.05 mole) of trimethoxy-bis(trifluoromethyl)methylenephosphorane in 13 parts of methylene chloride is cooled to 0° C. and 18 parts (0.05 mole) of bromine dissolved in 13 parts of methylene

TABLE I

| Trialkyl Phosphite | Thioketone | Trialkoxymethylenephosphorane |
|---|---|---|
| Tri-n-butyl phosphite | Thiobenzophenone | Tri-n-butoxybisphenylmethylene-phosphorane. |
| Trimethyl phosphite | 2, 4-bis (trifluoromethyl)-2, 4-bis (pentafluoroethyl)-1,3-dithietane. | Trimethoxy (trifluoromethyl) (pentafluoroethyl) methylene-phosphorane. |
| Triethyl phosphite | 4,4'-diphenylthiobenzophenone | Triethoxybis (4-biphenylyl) methylenephosphorane. |
| Tri-n-propyl phosphite | 4,4'-dimethoxythiobenzophenone | Tri-n-propoxy bis(4-methoxyphenyl)-methylenephosphorane. |
| Trimethyl phosphite | 4,4'-bis (dimethylamino) thiobenzophenone | Trimethyl bis (4-dimethylaminophenyl) methylenephosphorane. |
| Do | 4H-heptafluoro-2-butanethione | Trimethoxy (trifluoromethyl) (2H-tetrafluoroethyl) methylenephosphorane. |
| Triethyl phosphite | 4-chloroheptafluoro-2-butanethione | Triethoxy (trifluoromethyl) (2-chlorotetrafluoroethyl) methylenephosphorane. |
| Tri-n-octyl phosphite | Perfluoro-2-heptanethione | Tri-n-octoxy (trifluoromethyl) (perfluoroamyl) methylenephosphorane. |
| Triisobutyl phosphite | Perfluoro-2-nonanethione | Triisobutoxy (trifluoromethyl) (perfluoroheptyl) methylenephosphorane. |
| Dimethyl ethyl phosphite | 4,4'-dichlorothiobenzophenone | Dimethoxyethoxy bis (4-chlorophenyl) methylenephosphorane. | chloride is added dropwise over a period of 10 minutes. The colorless reaction mixture is then distilled under reduced pressure. There is obtained 12.7 parts of colorless liquid, B.P. 53–56° C./0.5 mm. that solidifies to a waxy solid upon cooling. This solid, which melts at 52–54° C. is dimethylbromobis(trifluoromethyl)methylphosphonate. The nuclear magnetic resonance and infrared absorption spectra obtained on this solid are consistent with the proposed structure.

*Analysis.*—Calc'd for $C_5H_6BrF_6O_3P$: C, 20.64%; H, 2.06%; Br, 27.46%. Found: C, 18.39%; H, 2.19%; Br, 27.35%.

The trialkoxymethylenephosphoranes of this invention are also useful as antistatic agents in hydrocarbon fuels. For example, trimethoxybis(trifluoromethyl)methylenephosphorane incorporated in isooctane at concentrations of 0.0033 and 0.01% by weight increases the conductivity of the fuel from 0.1 picomho per meter ($10^{-14}$ ohm$^{-1}$ cm.$^{-1}$) to 3.02 and 3.61 picomhos per meter, respectively. This is an approximately 30-fold increase in conductivity in the hydrocarbon fuel produced by this additive.

The derivatives of the trialkoxymethylenephosphoranes e.g., the dimethyl 1,1-bis(trifluoromethyl)ethylphosphonate of Example A, the dimethyl bis(trifluoromethyl)methylenephosphonate of Example B, and the dimethyl bromobis(trifluoromethyl)methylphosphonate of Example C are useful as solvents for synthetic polymers, e.g., poly(chlorodifluorothioacetyl fluoride). When the product of Example C is used as a solvent, it will of course be employed at temperatures above its melting point, i.e., at temperatures above 52–54° C. The resulting solutions are useful for the preparation of coatings and films from these polymers.

Since obvious modifications and equivalents in the invention will be evident to those skilled in the chemical arts, I propose to be bound solely by the appended claims.

The embodiments of the invention in which an exclusive property or privilege is claimed are defined as follows:

1. A trialkoxyphosphorane wherein the phosphorus is singly bonded to each of three alkoxy groups and doubly bonded to a carbon in turn bonded to two other carbons attached only to members of the group consisting of carbon and halogen and forming part of at least one organic radical comprising carbon, any additional element in said radical being selected from the group consisting of halogen and hydrogen, the total number of carbons in said trialkoxyphosphorane other than those in the alkoxy groups being no more than 25.

2. A compound of the formula

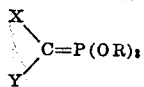

wherein R is an alkyl radical of up to 15 carbons and X and Y are selected (1), individually, from the group consisting of monovalent aromatic hydrocarbon radicals of up to 12 carbons and alkyl and halogenated alkyl radicals of up to 12 carbons and (2), jointly, from the group consisting of divalent aromatic hydrocarbon radicals of up to 12 carbons, the depicted carbon being joined to X and Y through carbons attached only to members of the group consisting of carbon and halogen and forming part of an organic radical comprising carbon, any additional element in said radical being selected from the group consisting of halogen and hydrogen.

3. Trialkoxybis(trifluoromethyl)methylenephosphoranes.

4. Trimethoxybis(trifluoromethyl)methylenephosphorane.

5. Triethoxybis(trifluoromethyl)methylenephosphorane.

6. Triisopropoxybis(trifluoromethyl)methylenephosphorane.

7. Tris(dodecyloxy)bis(trifluoromethyl)methylenephosphorane.

8. Trimethoxyfluorenylidenephosphorane.

9. The process which comprises reacting a trialkyl phosphite with a member of the group consisting of (1) thioketones of up to 25 carbons in which each carbon alpha to the thiocarbonyl carbon is attached only to members of the group consisting of carbon and halogen and forms part of an organic radical comprising carbon, any additional element in said radical being selected from the group consisting of halogen and hydrogen, and (2) dimers of said thioketones.

10. The process which comprises reacting trimethyl phosphite with tetrakistrifluoromethyl-1,3-dithietane.

11. The process which comprises reacting trimethyl phosphite with hexafluorothioacetone.

12. The process which comprises reacting trimethyl phosphite with thiofluorenone.

13. The process which comprises reacting triethyl phosphite with tetrakistrifluoromethyl-1,3-dithietane.

14. The process which comprises reacting triisopropyl phosphite with tetrakistrifluoromethyl-1,3-dithietane.

15. The process which comprises reacting trisdodecyl phosphite with tetrakistrifluoromethyl-1,3-dithietane.

No references cited.